Aug. 3, 1943.    T. B. TYLER    2,325,814
SPEED RESPONSIVE FLUID CONTROL MEANS
Filed May 9, 1938    2 Sheets-Sheet 1
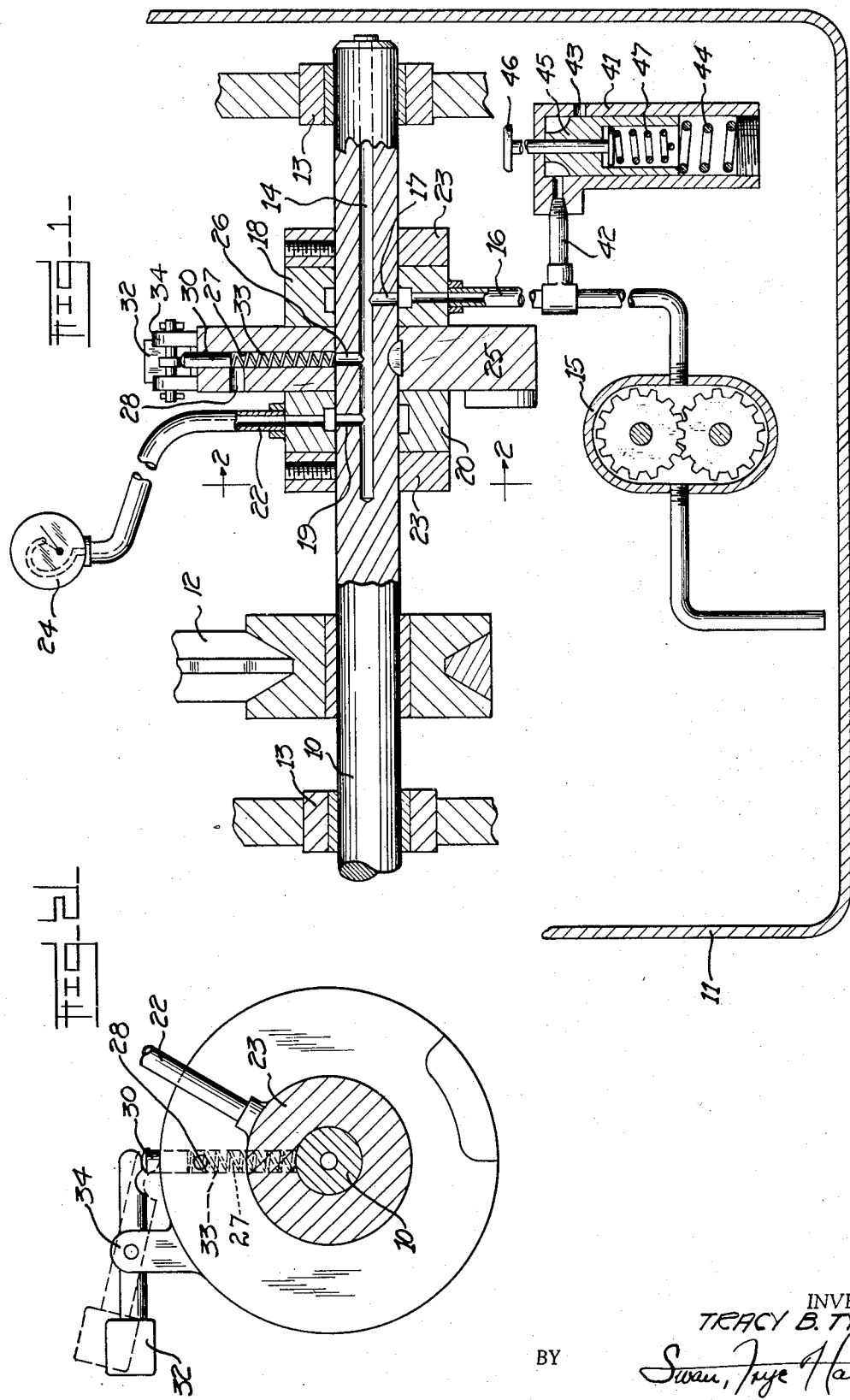
INVENTOR.
TRACY B. TYLER.
BY
Swan, Frye Hardesty
ATTORNEYS Aug. 3, 1943.　　　T. B. TYLER　　　2,325,814
SPEED RESPONSIVE FLUID CONTROL MEANS
Filed May 9, 1938　　　2 Sheets-Sheet 2
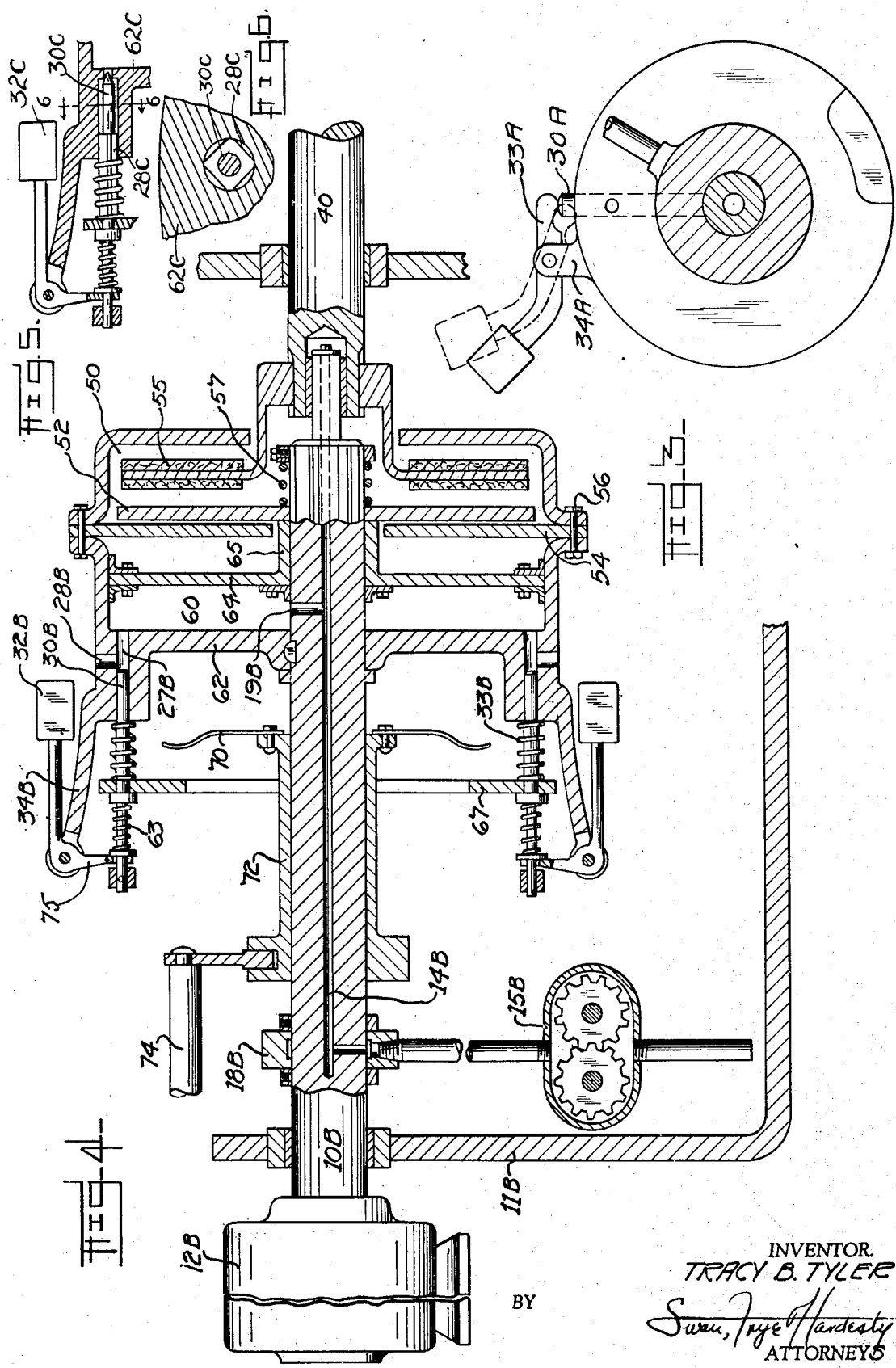
INVENTOR.
TRACY B. TYLER
BY
Swan, Tye Hardesty
ATTORNEYS Patented Aug. 3, 1943

2,325,814

UNITED STATES PATENT OFFICE 2,325,814

SPEED RESPONSIVE FLUID CONTROL MEANS

Tracy Brooks Tyler, Chicago, Ill., assignor to The Monopower Corporation, Detroit, Mich., a corporation of Michigan Application May 9, 1938, Serial No. 206,955

7 Claims. (Cl. 192—105)

This invention relates to novel fluid pressure regulating means for the control and/or operation of apparatus, gauges or instruments of various sorts, and in fact of almost any desired character, in response to speed variations of a selected shaft or mechanism. Such shaft or mechanism may be located either close to or remote from the controlled apparatus, and it will also be apparent that different fluids may be used and many different controlling functions effected. The primary object of the invention may be summarized as the provision of improved, simplified and relatively inexpensive means functioning to vary fluid pressure in accurate response and conformity to speed changes of desired apparatus, substantially independently of the viscosity or viscosity changes of the fluid.

A further object is to provide speed-responsive operating means which is lighter, more compact and more flexible in its operation than previously known means, and which is readily subjectable to simple and easily operable overcontrolling means by which its functioning can be modified or interrupted at will.

Other objects and advantages will be apparent from the following description, wherein reference is made to the accompanying drawings illustrating preferred embodiments of the invention and wherein similar reference numerals designate similar parts throughout the several views.

In the drawings:

Figure 1 is a substantially diametric sectional view showing a preferred embodiment of my invention, indicating somewhat diagrammatically the manner of connection thereof to a suitable fluid pumping and delivery system, and showing an indicating device controlled thereby.

Figure 2 is a cross sectional view taken substantially on the line 2—2 of Figure 1 and looking in the direction of the arrows.

Figure 3 is a view similar to Figure 2 showing a somewhat modified flyweight arrangement.

Figure 4 is a sectional view, similar to Figure 1, of a modified embodiment, illustrating the application thereof to the control of clutching apparatus.

Figure 5 is a fragmentary substantially radial sectional elevational view of another somewhat modified construction.

Figure 6 is a cross sectional view taken substantially on the line 6—6 of Figure 5, and looking in the direction of the arrows.

Referring now to the drawings, and particularly to Figures 1 and 2: reference character 10 designates a shaft, driven by a belt 12 from a suitable source of power (unshown), and 15 designates a fluid pressure pump, representative of a suitable source of fluid under pressure. The apparatus for automatically varying the effective pressure of the pump output is directly carried upon the shaft 10.

The shaft is indicated as mounted in bearings 13, and drilled to provide a central fluid passage 14, to which the pump 15 is connected by a conduit 16 and manifold 18, the latter encircling the shaft and the orbit of the radial feed port 17 therein. Also communicating with the fluid passage in the shaft is a radial outlet port 19, arranged to discharge the controlled fluid output, through a manifold 20, and delivery conduit 22 connected thereto. The manifolds 18, 20, float on the shaft, and may be located by collars as 23. Between the manifolds and keyed to the shaft is a governor body 25, having a radial passage 27 therein communicating through an opening 26 with the central fluid passage in the shaft. A valve 30 is slidable in passage 27 in the disc-shaped governor body, over an escape port 28. The valve is urged toward closed position, in response to mounting centrifugal force, by a flyweight 32, the action of the flyweight being opposed by the fluid pressure. If it is desired to maintain zero pressure in the conduit 22 until a predetermined speed has been reached, a spring 33 may be provided to impose an initial and predetermined opening force, the spring being trapped in the passage 27 beneath the valve. It will readily be perceived that in response to falling centrifugal force resulting from reduction of speed of the shaft 10, valve 30 tends to open, thereby reducing the output fluid pressure in conduit 22, while conversely an increase of speed and centrifugal force urges the valve more strongly toward closed position, increasing the pressure. The flyweight is shown as trunnioned in lugs 34 projecting from the periphery of the governor disc.

It will be apparent to those skilled in the art that the fluid pressure in conduit 22 may be made to vary within any desired limits, and that by changing the weight or radial path of the flyweights, the rate of change of output pressure with relation to the rate of rotation of shaft 10 may be made to follow any of many different proportionate variation patterns. In other words, the delivered fluid pressure may be made to vary in a ratio which is very nearly direct or "straight line" in its characteristics, or the delivered pressure curve may be given almost any desired character, according to the starting position and path of movement of the flyweight.

Figure 3 shows an arrangement of the arm 33A, by which the flyweight is carried, to travel in a path more nearly radial than the arm 33 of Figure 2, which is generally tangential and accordingly transmits to the valve a greater proportion of the centrifugal force developed by the weight. With the arrangement of Figure 3 not only is less usable centrifugal force developed because of the absorption of a greater proportion by the bearing lugs 34A, but the force may be made to diminish more rapidly as the arm moves nearer to the radial position.

Another valve, the case of which is designated 41, may be connected to the fluid delivery conduit 16, as by the connecting tube 42, and arranged to limit the maximum fluid pressure and to provide over-controlling means by which the delivered fluid pressure may be reduced to zero, or to any desired value. This will be seen to enable interrupting at will the fluid supply to the controlled apparatus. The valve body 45, slidable in the casing 41, normally covers an escape port 43, being urged toward closed position by a spring 44. If the pump pressure in conduit 16 overcomes spring 44, however, it forces piston valve 45 downward, allowing the excess pressure to escape through port 43. A pedally or otherwise suitably operated plunger 46 enables decreasing the effective resistance of spring 44 to assist or enable opening of the valve, the plunger acting upon the valve through an interposed spring 47, in the illustrated embodiment, to enable gradual manual reduction of pressure and maintenance of any pressure so selected, although it will be readily apparent that the plunger may act directly upon the valve if desired.

The output pressure may be put to many uses. In Figure 1 is a pressure gauge 24, shown connected to the output. It may be calibrated in revolutions per minute or otherwise to indicate the speed of shaft 10. In Figure 4 a modification is shown in which the prime mover 12B or other shaft rotating agency is effective to drive the load, designated 40, only when an interposed clutch, generally designated 50, is engaged, the operation of the clutch being governed by apparatus somewhat changed in its structural arrangement but functioning upon similar principles. In this embodiment, parts analogous to those already described have been given like reference characters distinguished by the addition of the letter "B" to each.

The fluid is supplied from a source such as that provided by the storage capacity of the casing 11B, by means of a pump 15B, which delivers the oil or other fluid to the shaft passage 14B. The shaft passage discharges, through a radial passage 19B, into a pressure chamber 60 defined by a drum-housing 62 carried by the shaft. Slidable in the drum housing and upon the shaft is a piston plate 64 having an integral sleeve portion 65 embracing and slidable upon the shaft and acting as a thrust element, movable by the piston to engage a clutch pressure plate 52, and force the latter into engagement with clutch plate 55 carried by driven shaft 40. The pressure plate will be seen also to be slidable upon shaft 10B and housed in a separate section of the drum housing, separated from the pressure chamber 60 by a web 54 projecting inwardly from the periphery and clamped in place by bolts 56 which secure together the separate sections of which the drum housing is formed. A clutch release spring 57 carried by the shaft tends to separate plate 52 from plate 55, while the resistance of this spring is overcome and the clutch applied whenever the pressure in chamber 60 is sufficient, as will readily be apparent.

One or more escape ports 28B are formed in the periphery of the drum in such manner that through them the pressure may be relieved in chamber 60, which may be drained through such ports. These openings are of greater capacity than the inlet through which fluid is admitted to the pressure chamber, and are controlled by centrifugally operable valves 30B, of which two are shown, slidable in passages 27B arranged parallel to the axis of shaft 10B. To prevent binding of the valves in the passages 27B due to centrifugal force, the valves, which are of the plunger type, are rigidly carried by a ring 67 encircling and slidable longitudinally of the shaft. Flyweights 32B are pivoted upon arms 34B extending from the drum, and the supporting arm 75 of each weight, formed as a bellcrank, reacts against the ring and valve assembly in such a manner that increase of centrifugal force due to increasing speed of shaft 10B urges the valves 30B more strongly toward closed position, thus building up fluid pressure in the chamber 60, while slowing of the shaft 10B tends to allow the valves to open under the fluid pressure, decreasing or relieving the pressure in chamber 60. Springs as 33B may also be provided additionally opposing the flyweights and tending to prevent closing movement of the valves until a predetermined force has been developed by the flyweights. Instead of reacting directly against the valves and ring assembly, additional springs as 63 may be interposed between the flyweight arms and the ring.

Additional manually controllable means for varying the effective developed fluid pressure is provided by spring fingers 70, carried by a sleeve 72 slidable upon the shaft. The sleeve is movable by means of an operating rod 74, into and out of various positions in which the springs 70 oppose to a greater or less extent the closing force upon valve-carrying ring 67, as may be desired. Thus the clutch and/or other controlled apparatus may be manually over-controlled to any desired degree regardless of the speed of shaft 10B, or may be rendered inoperative at will. This manual operation is unaffected by centrifugal force as, due to the peripheral positioning of escape ports 28B, no fluid can be trapped in chamber 60 to exert pressure upon the piston because of centrifugal force, and for the additional reason that the valves are directly acted upon by the manual control mechanism.

A further modification shown in Figures 5 and 6 conforms substantially to the embodiment last described, except that the control valves (of which one only is shown, designated 30C), are arranged to seat positively rather than slide over a side-opening port. The danger of sticking in the event dirt should get between the walls and the valves is thus eliminated, since a close fit, although necessary in the sliding type of valve, is not necessary with the seating type. In fact the use of a special escape port may be eliminated by so forming the valve and its guide as to allow the escape of the fluid past the valve itself. In the shown construction the guided end of the valve is provided with flats 28C giving it a substantial square cross section. Being guided in a round bore, the fluid may escape through the spaces between the flats and the bore when the valve is off its seat.

While it will be apparent that the preferred embodiments of the invention herein disclosed are arranged for hydraulic operation, and for the control of particular apparatus, it will be readily apparent that any desired fluid might be employed, and that the controlled apparatus might be of any desired character, associated or unassociated in other respects with the controlling shaft, and that in its physical location such controlled apparatus might be either close to or remote from the controlling apparatus.

In view, therefore, of the many modifications which will be apparent to those skilled in the art, I desire to be limited only by the scope of the subjoined claims.

What I claim is:

1. In combination with a rotatable element and a source of fluid under pressure, means for changing the effective pressure of the fluid from said source, comprising an escape valve connected to said source and adapted to be urged toward opened position thereby, said valve also being carried by and rotatable with said element, centrifugal means driven by said element and acting upon said valve to urge the same toward closed position with a force dependent upon the rate of rotation of said element, and resilient means interposed between said centrifugal means and valve to allow limited independent movement of the centrifugal means and valve.

2. In combination with a rotatable element and a source of fluid under pressure, means for changing the effective pressure of the fluid from said source, comprising an escape valve connected to said source and adapted to be urged toward opened position thereby, said valve also being carried by and orbitally rotatable with said element and longitudinally movable in a path transverse to a radius of rotation, centrifugal means also carried by and rotatable with said element and acting upon said valve to urge the same toward closed position with a force dependent upon the rate of rotation of said element, means tying the valve against unwanted radial actuation by centrifugal force to prevent direct action of such force upon the valve, whereby the valve is normally actuated by a force which is the resultant of fluid pressure and centrifugal force, and selectively actuable overcontrolling means for modifying the effects of such resultant force upon said valve.

3. A centrifugally operable clutch construction adapted to control the connection of variable speed driving and driven elements, comprising in combination with a friction clutch and a source of fluid under pressure, fluid-operable motor means for actuating the clutch, means providing communication between said fluid source and the motor means, an escape valve communicating with said motor means, said valve when open venting the fluid pressure from the motor means to prevent actuation of the clutch by the motor means, said valve being urged toward open position by the pressure from said source, and movable toward closed position against such pressure, whereby said valve may control the effective fluid pressure applicable to the motor to actuate the clutch, and a flyweight rotatable by the driving element and connected to said valve to actuate the same, said weight being arranged to urge the valve toward closed position against the effort of said fluid pressure, in response to rising centrifugal force resulting from increased speed of said driving element.

4. Means as set forth in claim 3 including resilient preloading means providing predetermined resistance to closing movement of the valve, and means including a resilient personally operable offsetting member for changing the effective effort of said preloading means.

5. Means as set forth in claim 3 in which closing movement of the valve and consequent increase of effective fluid pressure tends to actuate the clutch toward engaged position, and spring means tending to move the clutch and the valve toward clutch-released position.

6. A centrifugally operable clutch construction adapted to control the connection of variable speed driving and driven elements comprising in combination with a friction clutch and a source of fluid under pressure, fluid-operable motor means for actuating the clutch, means providing communication between said fluid source and the motor means, an escape valve communicating with said motor means, said valve when open venting the fluid pressure from the motor means to prevent actuation of the clutch by the motor means, said valve being urged toward closed position against such pressure, whereby said valve may control the effective fluid pressure applicable to the motor to actuate the clutch, and a flyweight rotatable by the driving element and connected to said valve to actuate the same, said weight being arranged to urge the valve toward closed position, against the effort of said fluid pressure, in response to rising centrifugal force resulting from increased speed of said driving element, and spring means interposed between the flyweight and valve and allowing limited independent movement of one with respect to the other.

7. A centrifugally operable clutch construction adapted to control the connection of variable speed driving and driven elements comprising in combination with a friction clutch and a source of fluid under pressure, fluid-operable motor means for actuating the clutch, means providing communication between said fluid source and the motor means, an escape valve communicating with said motor means, said valve when open venting the fluid pressure from the motor means to prevent actuation of the clutch by the motor means, said valve being urged toward closed position against such pressure, whereby said valve may control the effective fluid pressure applicable to the motor to actuate the clutch, and a flyweight rotatable by the driving element and connected to said valve to actuate the same, said weight being arranged to urge the valve toward closed position, against the effort of said fluid pressure, in response to rising centrifugal force resulting from increased speed of said driving element, said motor means comprising a pressure chamber portion concentric with and rotatable about the axis of planetary rotation of the flyweight, and a displacement element movable in said chamber portion by changes of fluid pressure and said escape valve having an escape port located substantially at the periphery of said chamber portion, whereby when the valve is open centrifugal force tends to eject fluid therefrom.

TRACY BROOKS TYLER.